(12) United States Patent
Friesen et al.

(10) Patent No.: US 8,895,197 B2
(45) Date of Patent: Nov. 25, 2014

(54) METAL-AIR LOW TEMPERATURE IONIC LIQUID CELL

(75) Inventors: Cody A. Friesen, Fort McDowell, AZ (US); Daniel A. Buttry, Tempe, AZ (US)

(73) Assignee: Arizona Board of Regents for and on behalf of Arizona State University, Tempe, AZ (US)

( * ) Notice: Subject to any disclaimer, the term of this patent is extended or adjusted under 35 U.S.C. 154(b) by 411 days.

(21) Appl. No.: 12/776,962

(22) Filed: May 10, 2010

(65) Prior Publication Data

US 2010/0285375 A1    Nov. 11, 2010

Related U.S. Application Data (60) Provisional application No. 61/177,072, filed on May 11, 2009, provisional application No. 61/267,240, filed on Dec. 7, 2009.

(51) Int. Cl.
*H01M 8/22* (2006.01)

(52) U.S. Cl.
USPC .......................... 429/403; 429/405; 429/406

(58) Field of Classification Search
CPC .................................................. H01M 12/06
USPC .................. 429/402, 403, 405, 406
See application file for complete search history.

(56) References Cited

U.S. PATENT DOCUMENTS

| | | | |
|---|---|---|---|
| 3,642,540 A | | 2/1972 | Argent et al. |
| 4,341,847 A | * | 7/1982 | Sammells ............... 429/404 |
| 6,500,575 B1 | * | 12/2002 | Shiue et al. ............. 429/405 |
| 6,573,405 B1 | * | 6/2003 | Abbott et al. ............ 564/292 |
| 2004/0157101 A1 | * | 8/2004 | Smedley ................ 429/30 |
| 2005/0141740 A1 | | 6/2005 | Preves et al. |
| 2007/0051620 A1 | | 3/2007 | Vico |
| 2007/0212583 A1 | | 9/2007 | Johnson |

FOREIGN PATENT DOCUMENTS

| | | | |
|---|---|---|---|
| JP | 2008066202 A | | 3/2008 |
| JP | 2008-293678 A | | 12/2008 |
| JP | 2008293678 | * | 12/2008 |
| JP | 2008293678 A | | 12/2008 |
| JP | 2009093983 A | | 4/2009 |
| WO | 2009/013629 A2 | | 1/2009 |

OTHER PUBLICATIONS

International Search Report and Written Opinion from International Patent Application No. PCT/US2010/034235 dated Aug. 9, 2010.
Japanese Office Action dated Apr. 15, 2014 of Japanese Application No. 2012-510902 (7 pgs including translation).
Taiwan Office Action with Search Report dated Jun. 11, 2014 of Taiwan Application No. 099114889 (7 pgs including Search Report translation).
Chinese Office Action dated Jun. 25, 2014 of Chinese Patent Application No. 201080019971.0 (18 pgs).

* cited by examiner

*Primary Examiner* — Ula C. Ruddock
*Assistant Examiner* — Thomas H. Parsons
(74) *Attorney, Agent, or Firm* — Pillsbury Winthrop Shaw Pittman LLP (57) ABSTRACT

The present application relates to an electrochemical metal-air cell in which a low temperature ionic liquid is used.

65 Claims, 5 Drawing Sheets

INLET AIR FLOW

OUTLET AIR FLOW

METAL-AIR LOW TEMPERATURE IONIC LIQUID CELL

PRIORITY INFORMATION

The present application claims priority to U.S. Provisional Application Ser. No. 61/177,072, filed May 11, 2009, and U.S. Provisional Application Ser. No. 61/267,240, filed Dec. 7, 2009, each of which is incorporated herein in their entirety.

This invention was made with U.S. government support under Contract No. DB-AR-0000038 awarded by the Department of Energy. The government has certain rights in the invention.

FIELD OF THE INVENTION

The present application relates to an electrochemical metal-air cell in which a low temperature ionic liquid is used.

BACKGROUND OF THE INVENTION

Metal-air batteries typically include a fuel electrode at which metal fuel is oxidized, an air electrode at which oxygen is reduced, and an electrolyte solution for providing ion conductivity. A significant limiting factor with metal-air batteries is the evaporation of the electrolyte solution, particularly the evaporation of the bulk solvent, such as water in an aqueous electrolyte solution. Because the air electrode is required to be air permeable to absorb oxygen, it also may permit the solvent vapor, such as water vapor, to escape from the cell. Over time, the cell becomes incapable of operating effectively because of this issue. Indeed, in many cell designs this evaporation issue renders the cell inoperable before the fuel is consumed. And this issue is exacerbated in secondary (i.e., rechargeable) cells, because the fuel may be re-charged repeatedly over the life of the cell, whereas the electrolyte solution is not (absent replenishment from an external source). Also, in rechargeable cells the water solvent is typically oxidized to evolve oxygen during re-charge, which may also deplete the solution.

To compensate for this problem, metal-air batteries with aqueous electrolyte solutions are typically designed to contain a relatively high volume of electrolyte solution. Some cell designs even incorporate means for replenishing the electrolyte from an adjacent reservoir to maintain the electrolyte level. However, either approach adds significantly to both the overall size of the cell, as well as the weight of the cell, without enhancing the cell performance (except to ensure that there is a sufficient volume of electrolyte solution to offset evaporation of the water or other solvent over time). Specifically, the cell performance is generally determined by the fuel characteristics, the electrode characteristics, the electrolyte characteristics, and the amount of electrode surface area available for reactions to take place. But the volume of electrolyte solution in the cell generally does not have a significant beneficial effect on cell performance, and thus generally only detracts from cell performance in terms of volumetric and weight based ratios (power to volume or weight, and energy to volume or weight). Also, an excessive volume of electrolyte may create a higher amount of spacing between the electrodes, which may increase ionic resistance and detract from performance.

SUMMARY OF THE INVENTION

One aspect of the present invention provides an electrochemical metal-air cell comprising a fuel electrode for oxidizing a metal fuel; an air electrode for absorbing and reducing gaseous oxygen; and an ionically conductive medium comprising a low temperature ionic liquid having a melting point at or below 150° C. at 1 atm. The ionic liquid is contained in a space between the fuel electrode and the air electrode for conducting ions for supporting the electrochemical reactions at the fuel and air electrodes.

Another aspect of the present invention provides a method of operating an electrochemical metal-air cell. The cell comprises: (i) a fuel electrode for oxidizing a metal fuel; (ii) an air electrode for absorbing and reducing gaseous oxygen; and (iii) an ionically conductive medium comprising a low temperature ionic liquid having a melting point at or below 150° C. at 1 atm., the ionic liquid being contained in a space between the fuel electrode and the air electrode for conducting ions for supporting the electrochemical reactions at the fuel and air electrodes. The method comprises: oxidizing the metal fuel at the fuel electrode; reducing absorbed gaseous oxygen at the air electrode; and conducting ions within the ionic liquid for supporting the electrochemical reactions at the fuel electrode and air electrode. The method is performed with the ionic liquid at a temperature at or above its melting point.

Yet another aspect of the present invention provides an electrochemical metal-air cell comprising a flexible fuel electrode for oxidizing a metal fuel; a flexible air electrode for absorbing and reducing gaseous oxygen; and an ionically conductive medium comprising a low temperature ionic liquid having a melting point at or below 150° C. at 1 atm. and contained in a space between the flexible fuel electrode and the air electrode for conducting ions for supporting the electrochemical reactions at the fuel and air electrodes. The flexible fuel electrode and the flexible air electrode are arranged in a compacted non-linear configuration with an external surface of the air electrode exposed for absorbing gaseous oxygen. Such a compact non-linear configuration may include wound in a cylindrical or non-cylindrical roll, or folded in an alternating manner, for example.

For the purposes of this application, a low temperature ionic liquid is defined as an ionic liquid having a melting point at or below 150° C. at 1 atm. These low temperature ionic liquids may also include the species known as room temperature ionic liquids, which are defined as ionic liquids having a melting point at or below 100° C. at 1 atm. Ionic liquids are also referred to as liquid salts. By definition, an ionic liquid is composed primarily of anions and cations of the salt. While an ionic liquid itself may be a solvent with respect to one or more other soluble products present in the ionic liquid, such as an additive or reactant by-product created by operation of the cell, an ionic liquid does not require the use of a solvent to dissolve the salt, as the liquid itself is "self-dissolving," i.e., it is a liquid of the electrolyte salt anions and cations by its own nature, and the use of a separate solvent to dissolve the salt is not necessary.

However, even though low temperature or room temperature ionic liquids are defined by their respective melting points at 1 atm., in some embodiments the cell may be operated in an environment with a different pressure, and thus the melting point may vary with the operating pressure. Thus, reference to a melting point at 1 atm. is used as a reference point to define these liquids, and does not imply or restrict its actual use conditions in operation.

Still yet another aspect of the invention provides an electrochemical metal-air cell comprising: a fuel electrode for oxidizing a metal fuel; an air electrode for absorbing and reducing gaseous oxygen; and an ionically conductive medium having a melting point at or below 150° C. at 1 atm.

and a vapor pressure at or below 1 mm Hg at 20° C. above its melting point. The ionically conductive medium is contained in a space between the fuel electrode and the air electrode for conducting ions for supporting the electrochemical reactions at the fuel and air electrodes.

Other objects, features, and advantages of the present invention will become apparent from the following detailed description, the accompanying drawings, and the appended claims.

DETAILED DESCRIPTION OF THE INVENTION

The present application discloses an electrochemical metal-air cell 10. The cell 10 may have any construction or configuration, and the example(s) described herein are not limiting. The cell 10 may be designed to have its electrodes arranged in a compact configuration, such as a roll configuration, as is shown in the Figures. In general, the cell 10 comprises a flexible fuel electrode 12 for receiving a metal fuel, a flexible air electrode 14, and an ionically conductive medium comprising a low temperature ionic liquid 16 (which may be a room temperature ionic liquid) contained in a space 18 between the flexible fuel electrode 12 and the air electrode 14. The ionic liquid 16 is in contact with internal surfaces 20, 22 of the fuel and air electrodes, respectively. In any architectural embodiment of the invention, the ionically conductive medium may be of any of the types mentioned herein.

In some non-limiting embodiments, a substance that may be regarded in some contexts as a solvent may be added in relatively small amounts to the ionic liquid, either for enhancing the solubility of solutes in the ionic liquid, such as an additive added to or a by-product created in the ionic liquid by operation of the cell, or for providing a non-solvent functionality, such as the promotion of certain electrochemical reactions or transport of ions. Thus, the use of an ionic liquid does not entirely exclude the presence of a substance that may be regarded as solvent in other contexts, or act as a solvent with respect to solutes in the ionic liquid, but because a solvent is not necessary to dissolve an ionic liquid, it can be used in a substantially smaller amount compared to conventional electrolyte salts requiring a bulk solvent for dissolution of the salt per se, such as aqueous electrolyte solutions. Indeed, in some non-limiting embodiments it is possible that no additive solvent is used.

In some non-limiting embodiments, the ionically conductive medium between the fuel and air electrodes may be a pure low temperature ionic liquid, i.e., it consists of the ionic liquid. In other non-limiting embodiments, it may consist essentially of the ionic liquid, meaning for the purposes of this application that it may include the ionic liquid and one or more other substances that do not materially effect its characteristic of being an ionic liquid. Thus, the term "consisting essentially of" an ionic liquid expressly encompasses the addition of one or more additives to enhance the ionic transport functionality of the ionic liquid, support the electrochemical reactions of the cell and/or enhance the solubility of solutes in the ionic liquid, but excludes the use of a bulk solvent required to dissolve the salt, such as is the case with aqueous electrolyte solutions. Of course, any presence of reaction by-products or ions in the ionic liquid would be permitted in either the embodiments consisting of the ionic liquid or the embodiments consisting essentially of the ionic liquid, as the very nature of the ionic liquid is to promote the transport and/or formation of such ions and/or by-products. The terms "solvent free" or "devoid of solvent" may be used to characterize the ionic liquid, and this terminology should be understood as (a) only excluding a bulk solvent that is provided for purposes of dissolving the ionic liquid, and not excluding the ionic liquid itself, which may act as a solvent with respect to another substance (e.g., an additive or the cell reaction by-products); and (b) not excluding the presence of one or more additives to enhance the ionic transport functionality of the ionic liquid, support the electrochemical reactions of the cell and/or enhance the solubility of solutes in the ionic liquid, even if such an additive theoretically could be regarded as a solvent in other contexts or with respect to solutes in the ionic liquid, but is not functioning for purposes of dissolution of the ionic liquid (for example, in some embodiments, water in the 10-100 ppm range may be used to promote the electrochemical reactions by increasing proton availability for supporting the oxygen reduction reaction, but the water is not functioning as a solvent with respect to the ionic liquid, although it may function as a solvent in other types of electrolytes, namely aqueous electrolytes).

The fuel and air electrodes 12, 14 are each configured to prevent or essentially prevent liquid permeation of the ionic liquid 16 therethrough via external surfaces 24, 26 thereof. That is, the electrode materials are selected to prevent or essentially prevent the ionic liquid 16 from permeating in liquid form through the thickness of the electrodes 12, 14 so as to escape from the space by such liquid permeation. The term "essentially prevent" recognizes the fact that some minor liquid permeation may occur, as the porosity used to permit air/oxygen permeation may allow minor amounts of liquid permeation, but "essentially prevents" means the liquid permeation that occurs is not substantial and has little or no material impact on the operation of the cell 10.

Because a low temperature ionic liquid is used in the cell, the problems associated with evaporation of a bulk solvent from an electrolytic solution may be essentially eliminated. One of the properties of most low temperature ionic liquids is that they have a low vapor pressure (some have an essentially immeasurable vapor pressure under standard conditions) and thus experience little or no evaporation. Because an excessive amount of solvent need not be included in the cell or in a separate reservoir to compensate for evaporation over time, a relatively low amount of ionic liquid—possibly even just a minimal amount sufficient to support the electrochemical reactions—may be used in the cell, thus reducing its overall weight and volume and increasing its power to volume/weight ratios. Moreover, this ability to have a lower volume enables the cell to have a thinner profile, which enables it to be arranged in a compact configuration, such as a wound or folded configuration.

Also, many low temperature ionic liquids have a large electrochemical window, i.e., they are stable over a large potential. In some embodiments, this may minimize or reduce the consumption of the ionic liquid (such as occurs with the oxidation of water solvent during the recharge of an aqueous electrolyte metal-air cell). Thus, preferably, consumptive oxidation and reduction of the ionic liquid may occur at potentials that are anodic and cathodic of the oxidation and reduction potentials, respectively, occurring during discharge or recharge (if applicable) of the cell 10. In contrast, with aqueous electrolyte solutions, the water solvent is typically oxidized during re-charge, thus contributing to its consumption.

The fuel electrode 12 may have any construction or configuration. For example, the fuel electrode 12 may be a porous structure with a three-dimensional network of pores, a mesh screen, a plurality of mesh screens isolated from one another, or any other suitable electrode. The fuel electrode 12 includes a current collector, which may be a separate element, or the body on which the fuel is received may be electroconductive and thus also be the current collector. Preferably, the fuel electrode 12 is laminated, bonded, or attached to a backing that provides the external surface 24 of the fuel electrode 12. This backing is liquid impermeable or essentially impermeable to the ionic liquid to prevent it from permeating outwardly through the fuel electrode 12 via its external surface 24. More preferably, the backing is also impermeable to air, and particularly oxygen or other oxidant, to prevent any undesirable parasitic reaction, such as oxidant reduction in the presence of the fuel oxidation that occurs at the electrode during discharge.

The metal fuel may be of any type, and may be electrodeposited, absorbed, physically deposited, or otherwise provided on or constituting the fuel electrode 12. The fuel may be of any metal, including alloys or hydrides thereof, for example. For example, the fuel may comprise zinc, iron, aluminum, magnesium, gallium, manganese, vanadium, lithium or any other metal. As used herein, the term metal fuel refers broadly to any fuel comprising a metal, including elemental metal, metal bonded in a molecule, metal alloys, metal hydrides, etc. The fuel electrode may be formed of the metal fuel as the electrode body itself in some embodiments.

Further details regarding metal fuels and fuel electrodes may be found in U.S. patent application Ser. Nos. 12/385,217, 12/385,489, 12/631,484, 61/329,278, and 61/243,970, the entirety of which are incorporated herein. For example, the reactions at the anode, the cathode, and in solution can be represented by reactions (1)-(3), respectively below:

$$Zn + 4OH^- \rightarrow Zn(OH)_4^{2-} + 2e^- \ (E°=-1.216V) \quad (1)$$

$$2e^- + \tfrac{1}{2}O_2 + H_2O \rightarrow 2OH^- \ (E°=0.401V) \quad (2)$$

$$Zn(OH)_4^{2-} \rightarrow ZnO + H_2O + 2OH^- \quad (3)$$

Thus, for one mole of oxygen gas ($O_2$), the reactions involve four (4) electrons generated at the anode, and consumed at the cathode.

The metal fuel may be selected from the transition metals (i.e., groups 3-12 of the periodic table) or the other or post-transition metals (i.e., in groups 13-15, excluding the metalloids). The metal fuel may also be selected from the alkaline earth metals (i.e., group 2 of the period table). The metal may be essentially pure or pure so that all its mass is available as fuel for oxidation to maximize its energy density.

While lithium may be used as the metal fuel in the broader aspects of the invention, lithium is highly reactive, unstable, and difficult to work with. Indeed, lithium is highly reactive in air, and metal-air batteries are by their very nature designed for exposure to air, so lithium's reactivity poses particular practical issues that may limit its uses.

In certain embodiments, the technology of this application, however, may advantageously be used with metals that are safer, more stable, and easier to work with, such as, for example, magnesium, zinc, manganese, gallium and aluminum. Metals from the alkaline earth metals, transition metals, and post-transition metals tend to be more stable than the alkali metals, of which lithium is a member. As will be seen below, the technology of this application allows metals from these groups to be used to achieve an energy density competitive with or better than existing lithium-ion or lithium-air technology, without having to deal with the negative aspects of lithium technologies. However, in some other embodiments, lithium or another alkali metal may be the metal of the metal fuel.

The air electrode 14 is designed to absorb air, typically ambient air, exposed to its external surface 26 in a manner described below. When air is exposed to the external surface, the air electrode 14 is able to absorb gaseous oxygen (or another oxidant) for reduction of the oxygen during discharge of the cell 10.

The air electrode 14 may be made porous to provide gaseous oxygen diffusion from the air side of the electrode to reaction sites within the electrode and to provide ionic conductivity for reactants and reaction products on electrolyte side of the electrode. The air electrode may have a level of solvophobicity with the ionic liquid 16 to prevent or essentially prevent wicking (i.e., liquid permeation) of the electrolyte through the structure. A current collector may be embedded in the electrode to provide high electrical conductivity. The materials of construction may include carbon particles: PTFE, FEP, PFA, or another fluorinated polymer; electrocatalysts that may be metal oxides such as manganese oxide, nickel oxide, cobalt oxide, or doped metal oxides; electrocatalysts that may be metals such as nickel, cobalt, manganese, silver, platinum, gold, palladium, or another electrocatalytically active material. These examples are not limiting.

Further details regarding the air electrode may also be found in the above-incorporated applications.

Preferably, the cell 10 comprises one or more seal members (not shown) along a periphery of the fuel and air electrodes 12, 14 for sealing the space 18 between the fuel and air electrodes 12, 14 to contain the ionic liquid 16 therein. These seal members are electrically insulating to prevent electrical conduction between the fuel and air electrodes 12, 14 (i.e. they prevent shorting). These seal members are attached to secure the peripheries of the fuel and air electrodes 12, 14 prior to being wound into a roll 15, and thus are also flexible to permit such winding. For example, the seal members could be clips, welded, crimped structures, adhesives, epoxies, or any other suitable structure for sealing the space 18.

The cell 10 also includes a flexible separator 28 that is electrically insulating, as will be described herein below.

Figure 1:
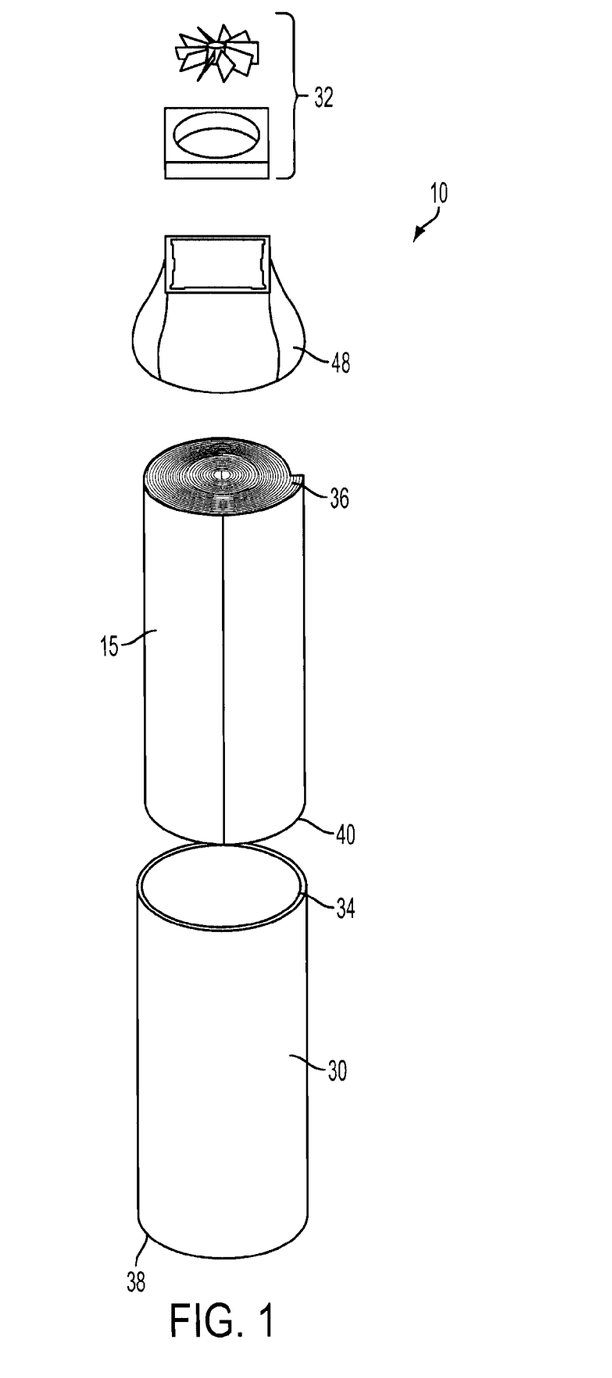
FIG. 1 is an exploded view of a cell in accordance with an embodiment of the invention.
Figure 2:
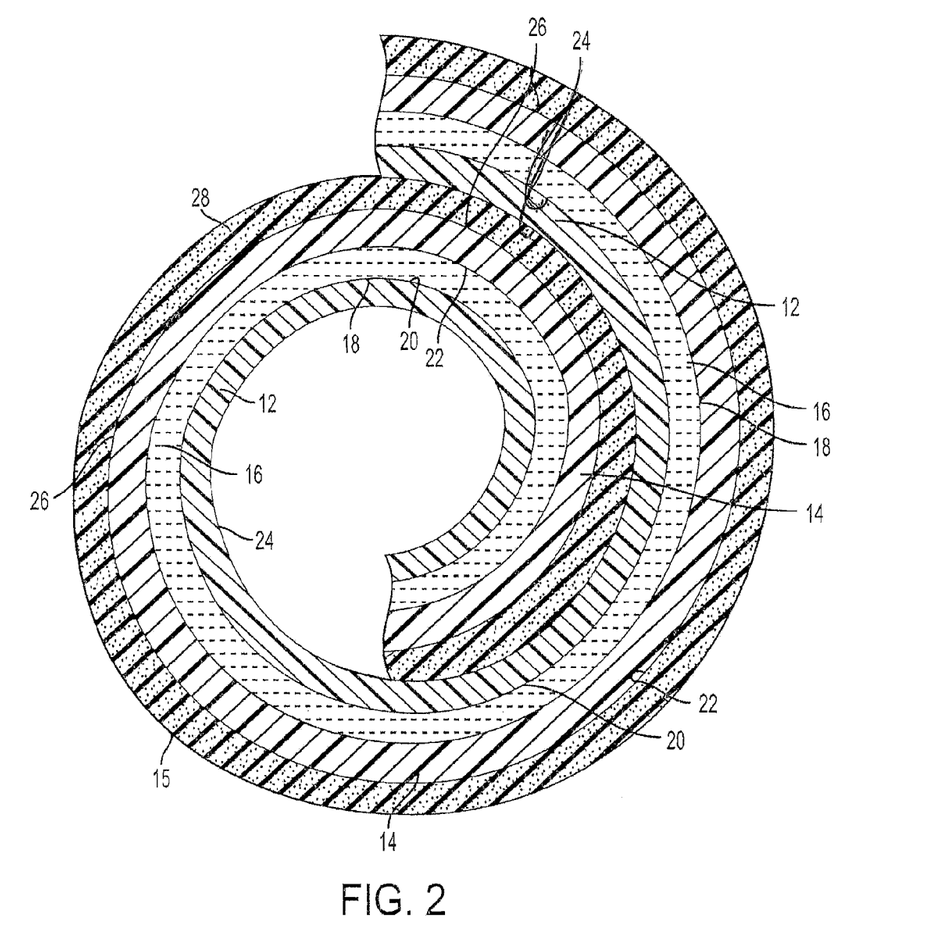
FIG. 2 is an exaggerated cross-sectional view of the roll used in the cell, the exaggeration permitting the layers to be seen easier.

As is shown in FIG. 2, the flexible fuel electrode 12, the flexible air electrode 14, and the flexible separator 28 are wound in a roll 15 with the flexible separator 28 positioned between the external surfaces 24, 26 of the fuel electrode 12 and the air electrode 14 to prevent electrically conducting contact between the external surfaces 24, 26 of the fuel and air electrodes 12, 14. That is, separator 28 is placed against one of the external surfaces 24, 26, and the electrode 12, 14 with the ionic liquid 16 sealed therebetween and the separator 28 are wound up to form a roll. Each of the structures wound in the roll has generally the same two-dimensional area and peripheral dimensions. An adhesive may optionally be used between the separator 28 and one or both of the external surfaces 24, 26 to promote bonding and securement of the roll against unwinding. The ionically conductive medium, which is devoid of rigid inflexible or brittle structures like glass and ceramic, permits the electrodes and separator (if any) to be flexed into the desired configuration as a roll or otherwise.

The roll shown in FIG. 2 is a cylindrical roll. However, that is not intended to be limiting. For example, the roll may have a prismatic shape, such as a roll having any polygonal cross-section, such as a triangle, square, rectangle, trapezoid, pentagon, hexagon or any other configuration, and thus the term roll means wound configurations, but is not limited to cylindrical rolls. For ease of reference, the terms circumferential, radial and axial may still be used to describe relative directions with respect to such non-cylindrical rolls, and the use of such terms does not imply that the roll is necessarily cylindrical.

The separator 28 also permits exposure of gaseous oxygen to the external surface 26 of the air electrode 14. Specifically, the separator 28 is designed to permit oxygen (such as pure oxygen or ambient air containing oxygen) or another oxidant to flow at least axially between the external surfaces 24, 26 within the cell 10 for exposure to the external surface 26 of the air electrode 14. The separator 28 may also permit circumferential flow of the oxygen or other oxidant between the external surfaces 24, 26. Thus, by enabling flow of oxygen or another oxidant in between the external surfaces 24, 26, the oxidant can penetrate the roll and be exposed to the external surface 26 of the air electrode 14 for absorption and reduction during discharge.

One example of a separator 28 may be a pleated polymer sheet that provides a space between the external surfaces 24, 26 of the fuel and air electrodes, while also guiding air axially within the cell 10. Another example is a woven polymer screen where the warp is significantly finer in dimension than the weft, providing a preferential flow direction between the weft fibers, which may be oriented axially or circumferentially within the roll. Any construction or configuration may be used. Exposure of oxygen to the air electrode's external surface can be by providing spacing to permit open air flow directly to the air electrode external surface, or by permitting permeation of the air through a porous body of the separator 28.

As an option, the cell 10 may further comprise a flexible internal separator (not shown) that is electrochemically inert in the ionic liquid and electrically insulating. The flexible internal separator is wound in the roll 15 and positioned in the space 18 between the internal surfaces 20, 22 of the fuel and air electrodes 12, 14 to prevent electrically conducting contact between the internal surfaces 20, 22 of the fuel and air electrodes 12, 14. This may not be necessary if the fuel and air electrodes 12, 14 have sufficient rigidity to maintain a spaced apart relation, but is preferred to prevent incidental contact therebetween that could short the electrodes 12, 14 together. For example, the internal separator could be an open-celled lattice, a screen, a grid, or any other structure with sufficient flexibility to enable it to be wound into the roll with the electrodes 12, 14, yet still allow the ionic liquid 16 to establish ionic conductivity between the fuel and air electrodes 12, 14.

During discharge, the fuel electrode 12 is configured to oxidize the metal fuel and the air electrode 14 is configured to reduce gaseous oxygen absorbed via the external surface 26 thereof. This generates a potential difference between the fuel and air electrodes 12, 14 for conducting current to a load, and the ionic liquid 16 conducts ions for supporting the electrochemical reactions at the fuel and air electrodes 12, 14. Specifically, the electrodes 12, 14 are connected to the load, such as by terminals connected to the current collectors of the electrodes 12, 14. The oxidation of fuel at the fuel electrode 12 liberates electrons as current flow to drive the load, and provides an oxidized species of the fuel to the ionic liquid 16. The air electrode 14 receives the electrons from the load, and reduces the oxygen it has absorbed to generate a reduced oxidant species for reaction with the oxidized fuel species, thus creating a metal oxide by-product. Reference may be made to the various patent applications incorporated herein for more specifics concerning the reactions, which need not be described herein in detail.

The ionic liquid 16 may have a vapor pressure equal to or less than 1 mm Hg at 20° C. above the ionic liquid's melting point at 1 atm. More preferably, it has a vapor pressure equal to or less than 0.5 mm Hg or 0.1 mm Hg at 20° C. above the ionic liquid's melting point at 1 atm. Still more preferably, the ionic liquid has a vapor pressure that is essentially immeasurable at 20° C. above the ionic liquid's melting point at 1 atm., and thus is regarded as essentially zero. Because a low or immeasurable vapor pressure means little or no evaporation, an excessive amount of ionic liquid 16 need not be included in the cell or in a separate reservoir to compensate for excessive evaporation over time. Thus, in some embodiments a relatively low amount of ionic liquid 16—even just a minimal amount sufficient to support the electrochemical reactions—can be used in the cell, thus reducing its overall weight and volume and increasing its power to volume/weight ratios. Moreover, this ability to have a lower volume enables the cell to have a thinner profile, which enables it to be wound into or otherwise arranged in a compact configuration.

The ionic liquid's melting point plus 20° C. at 1 atm. is used as the reference point for the ionic liquid's vapor pressure as a matter of convenience. Generally, a cell's operating temperature is above the ionic liquid's melting point, but the actual operating temperature may be different or may fluctuate in some embodiments. Rather than choose a point of reference that may vary based on operating conditions, such as the operating temperature, the ionic liquid's melting point plus 20° C. at 1 atm. may be used as a stable and verifiable reference point. The fact that this is used as a reference point does not imply that the cell need necessarily be operated at that temperature, and the operating temperature may be any temperature at or above the ionic liquid's melting point.

The vapor pressure of the ionic liquid 16 at the operating temperature (which may be within a range of operating temperatures) may also be used as the reference point as well. Thus, in some embodiments the cell operation method may be performed with the ionic liquid 16 at a temperature at or above its melting point and at which the vapor pressure of the ionic liquid 16 is less than or equal to the specified value. For example, the vapor pressure at the operating temperature may be at or below 1 mm Hg, 0.5 mm Hg, 0.1 mm Hg or immeasurable and essentially zero. Optionally, a heater, such as a controlled heater with temperature feedback, may be used to heat the cell and its ionic liquid to the operating temperature and maintain the temperature at a target temperature or within a target range. In some embodiments, no heater is necessary, and the cell may be designed to operate at standard ambient conditions (or it may operate in a high temperature environment where a heater is unnecessary).

In some non-limiting embodiments, the space 18 between the fuel and air electrodes 12, 14 is in the range of 10 microns to 300 microns. And preferably, it is in the range of 10 microns to 100 microns, or in the narrower range of 10 microns to 50 microns.

In some embodiments, the use of the ionic liquid 16 enables the cell 10 to have a relatively high ratio of combined electrode thickness to ionic liquid thickness (the same holds true for electrode volume to ionic liquid volume, as the area for both electrodes and the ionic liquid is the same). The ratio of combined electrode thickness to ionic liquid thickness may be in the range of 1:10 to 10:1, and more preferably is in the range of 1:1 to 10:1, or 2:1 to 10:1, or 4:1 to 10:1. The ratio may also be greater than or equal to 1:1, and the ratio may even be greater than or equal to 2:1, 4:1 or 10:1 in some embodiments, with no upper limit on the ratio.

The low temperature ionic liquid 16 may be of any type, including room temperature ionic liquids, and including but not limited to the examples disclosed in U.S. Provisional Application Ser. No. 61/177,072, filed May 11, 2009, the entirety of which is incorporated herein by reference. Examples of useable ionic liquids include aprotic ionic liquids synthesized from combinations of the anions of chloride ($Cl^-$), hexafluorophosphate ($PF_6^-$), bis(trifluoromethlysulfonyl)imide ($C_2F_6NO_4S_2^-$)(TFSI), or trifluoromethanesulfonate ($CF_3O_3S^-$) and cations of imidazolium, sulfonium, choline, pyrrolidinium or phosphonium and their derivatives. Protic ionic liquids, such as triethylammonium methanesulfonate and diethymethylammonium triflate may also be used. Ionic liquids with stable fluorine containing ions (such as bis(trifluoromethylsulfonyl)imide) may be desirable for their hydrophobic properties to avoid the absorption of water into the ionic liquid, particularly those with a high solubility for the metal cation of interest.

As examples, in one non-limiting embodiment the ionic liquid may be triethylammonium methanesulfonate (TEAMS) with 0.5 molar zinc triflate dissolved therein as an additive, and zinc may be used as the metal fuel. Potentiostatic studies of the half-cell reactions for zinc and oxygen in that ionic liquid indicate a cell potential of about 1.45V, and an estimated cell energy density in excess of 600 Wh/kg. Potentiostatic studies on the same TEAMS ionic liquid with 0.5 molar zinc triflate supplemented with 50 ppm water indicate a cell potential of about 1.5V. In another non-limiting embodiment, the ionic liquid may be TEAMS with 1.0 molar zinc bromide ($ZnBr_2$) dissolved as an additive, and zinc may be used as the metal fuel. Potentiostatic studies of the half-cell reactions for zinc and oxygen in that ionic liquid indicate a cell potential of about 1.3 V, an estimated cell energy density in excess of 500 Wh/kg, and a relatively high degree of reversibility for the zinc and oxygen reactions, which is beneficial for secondary (rechargeable) cells.

In yet another non-limiting embodiment, the ionic liquid may be methyloctylimidazolium chloride with 0.5 molar manganese (II) chloride ($MnCl_2$) and 50 ppm water as additives, and manganese may be used as the metal fuel. Potentiostatic studies of the half-cell reactions for manganese and oxygen in that ionic liquid indicate a cell potential of about 1.5 V and an estimated cell energy density of about 800 Wh/kg. In still another non-limiting embodiment, the ionic liquid may be 1-butyl-3-methylimidazolium bis(trifluoromethane)sulfonamide with 5.0 molar $AlCl_3$ as an additive, and aluminum may be used as the metal fuel. Potentiostatic studies of the half-cell reaction for aluminum in that ionic liquid indicate a cell potential of about 2.5-2.8 V, an estimated cell energy density of about 2500-3000 Wh/kg, and a relatively high degree of reversibility for the aluminum reaction.

In yet another non-limiting embodiment, the ionic liquid may be diethyl methyl ammonium triflate (DEMATf) with 0.5 M $ZnCl_2$ dissolved therein as an additive, and zinc may be used as the metal fuel. This embodiment has an estimated cell potential of about 1.3 V. As still another non-limiting embodiment, the ionic liquid may be DEMATf with 0.5 M $Zn(BF_4)_2$ (zinc tetrafluoroborate). This embodiment has an estimated cell potential of about 1.45V.

Still yet other non-limiting embodiments may include the following ionic liquids: (a) TEAMS with an additive of 0.01 molar Mn(II) acetate for use with manganese as the metal fuel, (b) diethylmethylammonium triflate with 1.0 molar $ZnCl_2$ as an additive for use with zinc as the metal fuel, (c) $GaCl_3$ and 1-methyl-3-octylimidazolium chloride in equal parts (tetrachlorogallate) for use with gallium as the metal fuel. In other embodiments, zinc flouride or zinc ditriflate may be used as an additive in the ionic liquid.

In some embodiments, the fuel electrode 12, air electrode 14, and separator 28 (and any internal separator) are configured as rectangular sheets with substantially greater length than width. The length is the direction that is ultimately circumferential in the roll 15, and the width is the direction that is ultimately axial in the roll 15. This enables the roll 15 to have an increased number of "laps," i.e. portions overlapping one another, within the roll 15, thus contributing to increased two-dimensional electrode area in the cell 10.

The cell 10 may optionally further comprise a housing 30 in which the roll 15 is received. The housing 30 may have any construction or configuration, and the illustrated housing is not intended to be limiting. Preferably, the housing 30 has a cylindrical configuration with an internal diameter corresponding to the external diameter of the roll 15 so that it fits closely within the housing 30, as is illustrated.

The cell 10 may also optionally further comprise an airflow generator 32 configured to force airflow into the roll between the external surfaces 24, 26 of the fuel and air electrodes 12, 14. The use of an airflow generator 32 facilitates the delivery of air to the external surface 26 of the air electrode 14. The airflow generator 32 may be an electrically powered fan or impeller, as illustrated, a bellows or any other device designed to generate airflow. For example, instead of generating positive pressure, a vacuum could generate negative pressure to force the airflow as well.

Figure 3:
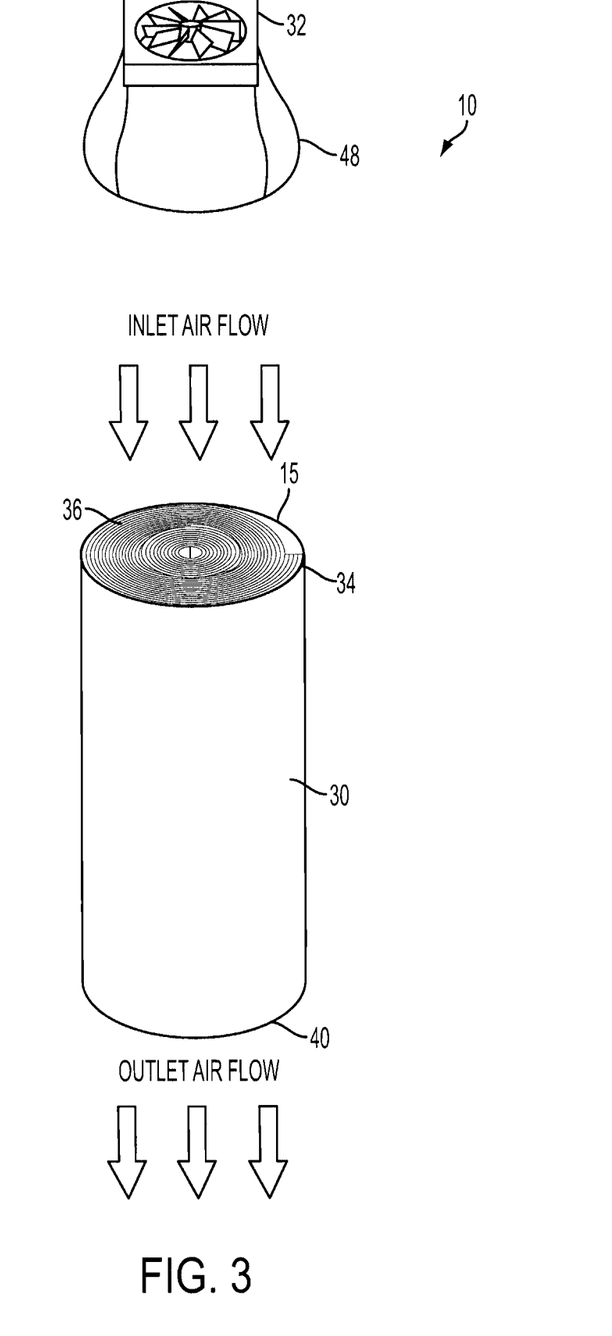
FIG. 3 is another exploded view of the cell of FIG. 1. showing its airflow.

As shown in FIG. 3 the housing 30 may have an open axial airflow receiving end 34 and an axial airflow receiving end 36 of the roll 15 may face the open axial airflow receiving end 34 of the housing 30. The airflow generator 32 may be configured to force airflow into the open axial airflow receiving end 34 of the housing and into the axial end 36 of the roll 15 between the external surfaces 24, 26 of the fuel and air electrodes 12, 14. The housing 30 may also have an open axial airflow exit end 38 opposite the airflow receiving end 34, and the roll 15 may an axial airflow exit end 40 facing the open airflow exit end 38 of the housing 30. The airflow generator 32 may also force the airflow axially through the roll 15 between the external surfaces 24, 26 of the fuel and air electrodes 12, 14 and axially outward from the axial airflow exit end 40 of the roll 15 for exit through the open axial airflow exit end 38 of the housing.

Figure 4:
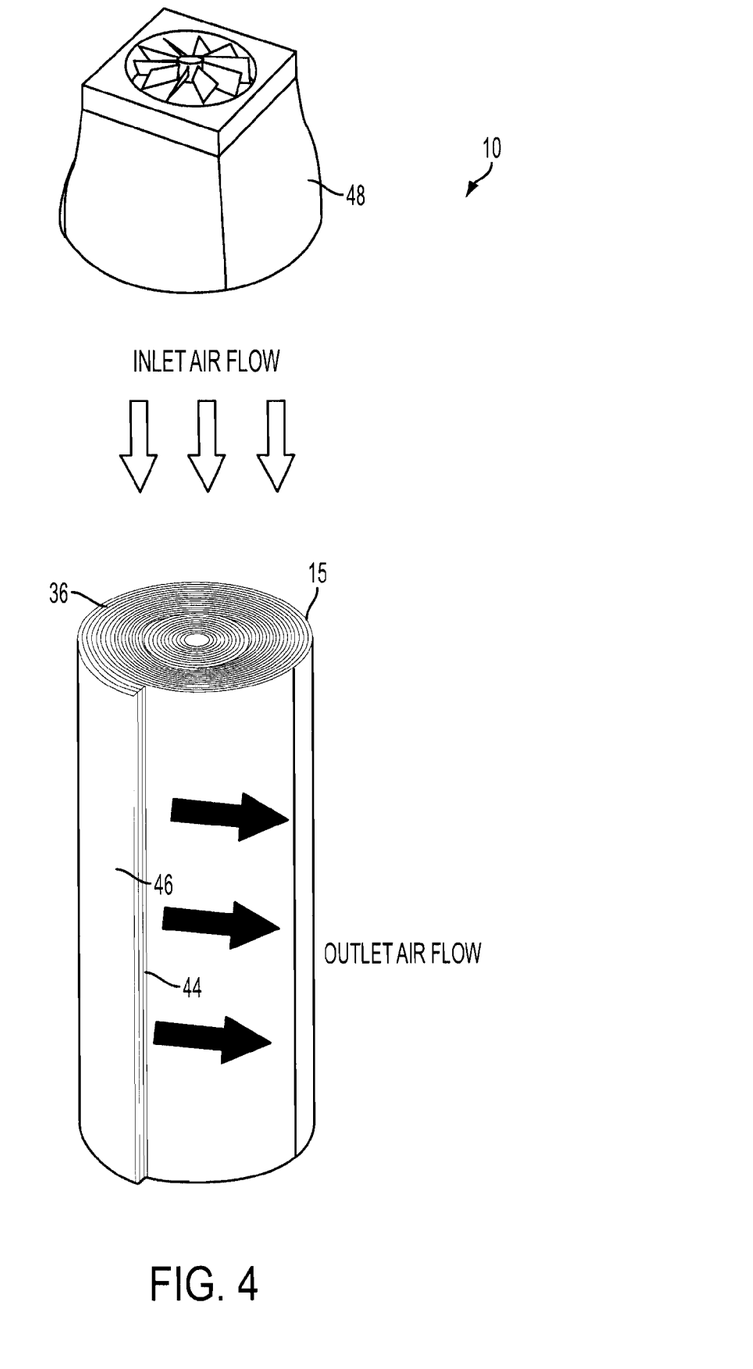
FIG. 4 is a view similar to FIG. 3 showing an alternative embodiment.

In an alternative approach, shown in FIG. 4, the roll may also have a circumferential airflow exit 44 defined by ends of the fuel and air electrodes 12, 14 on an outermost lap 46 of the roll 15. Thus, the airflow generator 32 may force the airflow into the axial airflow receiving end 36 of the roll between the external surfaces 24, 26 of the fuel and air electrodes 12, 14 and outwardly from the circumferential airflow exit 44. Thus, the airflow may be initially axial, but exit in the circumferential direction of the roll 15. This may be dictated by a structure blocking or otherwise closing off the opposite axial end of the roll 15 (e.g., a closed end of the housing 30 could block the opposite axial end of the roll 15), thus forcing the airflow to exit the roll 15 through the circumferential airflow exit 44.

The use of a housing 30 may be optional, and the airflow generator 32 may be coupled directly to the roll 15, as is shown for example in FIG. 4. Of course, a housing 30 could be used, and suitable ports for permitting exit of the airflow could be provided wherever is suitable, and the illustrated examples are not limiting.

The airflow generator 32 may be mounted in a cowling 48 as illustrated. This cowling 48 may attach to an axial end 34 of the housing 30, as shown in the FIG. 3, or directly to the axial end 36 of the roll, as shown in FIG. 4. The cowling 48 illustrated, or its use in general, is optional is not intended to be limiting.

The use of an airflow generator is optional and the cell 10 may operate by passive delivery of the oxidant (typically oxygen in ambient air).

In some embodiments, the cell may be designed as a secondary or rechargeable cell, meaning that a power source can be coupled to the electrodes 12, 14 for recharging the cell by oxidizing an oxidizable oxygen species to evolve oxygen and reducing and electrodepositing a reducible metal species on the fuel electrode 12. Any metal oxide formed during discharge may disassociate during re-charge to provide availability of the reducible fuel species (which is typically the fuel species generated during fuel oxidation during discharge) and oxidizable oxygen species (which is typically the oxygen species generated during oxygen reduction during discharge). Preferably, the air electrode 14 may function as an anode during re-charge for oxidizing the oxidizable oxygen species, with the fuel electrode 12 functioning as a cathode for reducing the reducible fuel species. Alternatively, a separate flexible third electrode dedicated to oxygen evolution may be included in the cell 10 and wound into the roll 15 with the fuel and air electrodes 12, 14 (and would have the same dimensions). The anodic potential of the power source would thus be applied to this third electrode, which functions to oxidize the oxidizable oxygen species and evolve the oxygen. Either the air electrode functioning as an anode or this third electrode may be referred to as a charging electrode. The ability to re-charge the cell is optional and should not be regarded as limiting.

Figure 5:
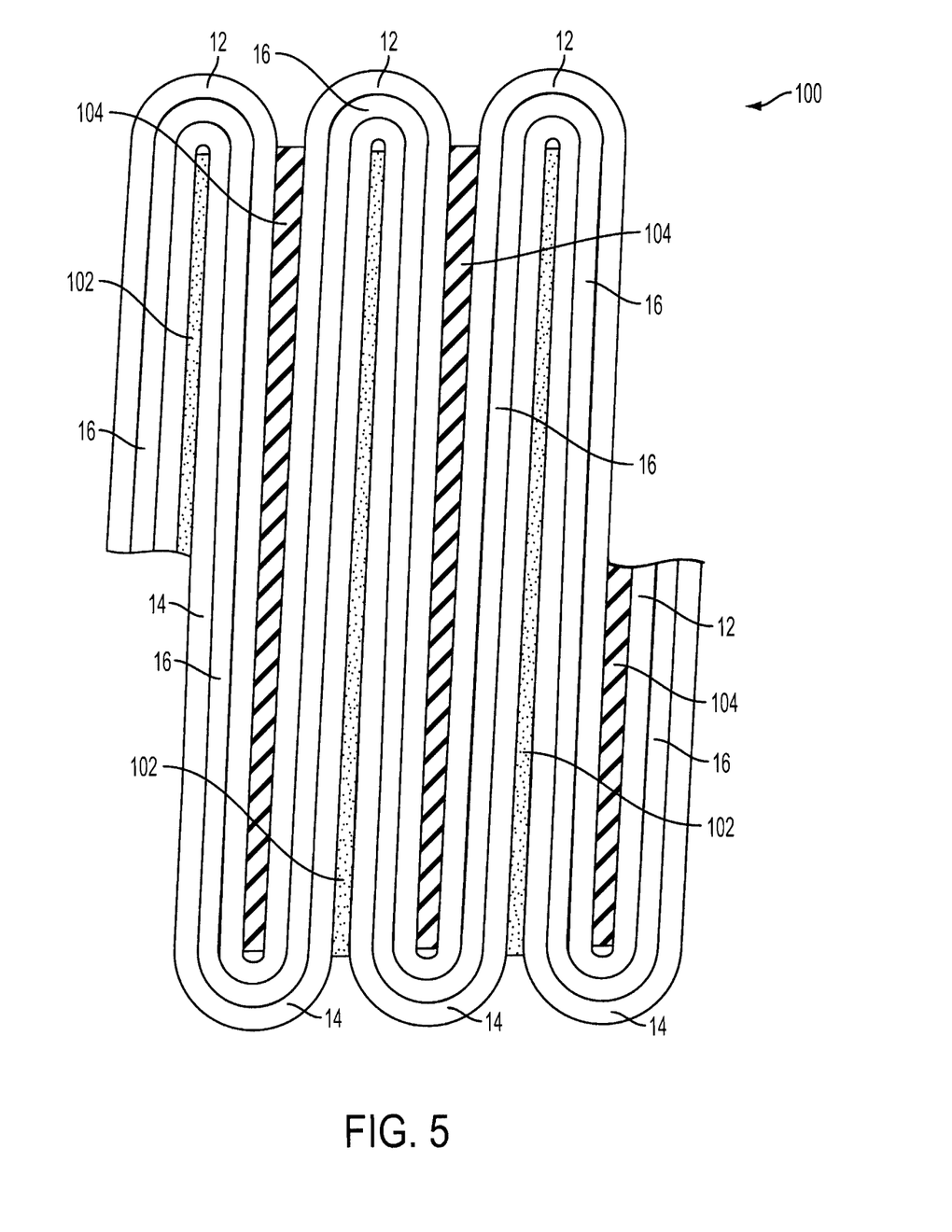
FIG. 5 is a view showing an alternative compacted, non-linear configuration for the cell.

FIG. 5 shows an alternate embodiment of a cell 100 wherein the flexible fuel electrode 12 and the flexible air electrode 14 are folded in an alternating manner with portions of the air electrode's 14 external surface facing one another and portions of the fuel electrode's 12 external surface facing one another (similar reference numbers are used to denote the same structures as the prior embodiments). A plurality of separators 102 may be positioned between at least the portions of the air electrode's 14 external surfaces facing one another. These separators 102 are configured to enable the gaseous oxygen, typically as is present in ambient air, to be exposed to the air electrode's 14 external surface, similarly to separator 28. It is less important to be concerned with electroconductive contact in this configuration, as contact between an electrode and another portion of itself will not cause shorting, whereas in the rolled configuration the two electrodes are facing one another, and contact therebetween may cause shorting. A suitable housing or framework may be used to contain this folded cell 100.

Additionally, separators 104, which need not permit air or oxygen flow, may be used between the portions of the external surfaces of the fuel electrode 12 to assist in locating the electrodes, providing support and/or preventing the folding in the associated areas from being too sharp, which may crease or damage the electrodes. These separators 104 may be the same as separators 102 to facilitate manufacturing and avoid the need for differentiating between two different separators during assembly. Thus, it can be appreciated that a rolled configuration is not the only possible configuration of the cell. The cell 10 may have other compacted non-linear configurations, such as the alternate folded configuration illustrated in FIG. 5, or other configurations.

In any embodiment, it is possible to eliminate the separator 28 or separators 102, and the separation noted (either between the fuel and air electrode external surfaces, or the adjacent air electrode external surface portions) may be achieved by other structures. For example, a retainer may position the electrodes in the spaced apart relation. By way of examples only, such a retainer may be a groove or seat formed in a housing or frame, clips, locating features or other such structures, and need not be a layer or structure that is positioned between the electrodes or portions thereof.

In some embodiments, the electrodes need not be wound, folded, or otherwise arranged in a compacted configuration (although that is preferred for achieving high power and/or energy density in a manageable and practical geometric volume). It is possible for the electrodes to be flat, or have any other configuration, in some embodiments, including but not limited to low power and/or low energy storage applications.

Typically, in any use of a cell the oxygen absorbed and reduced by the air electrode 14 will be from ambient air. However, it is possible to operate a cell in an oxygen enriched environment for some applications. Thus, reference to gaseous oxygen includes both oxygen naturally present in ambient air, oxygen enriched air, and any other form comprising or consisting of gaseous oxygen.

Although the embodiments discussed above have the ionic liquid contacting both the fuel and air electrodes, it is possible in other embodiments to have it contacting just one electrode (i.e., the fuel electrode on the air electrode) with another ionically conductive layer or medium contacting the other electrode, and an interface, such as a liquid junction or thin, flexible permeable membrane, would be provided therebetween. Either way, the additional layer or medium would be flexible (either by being a flexible solid/semi-solid, or being a liquid, which is inherently flexible), as would any membrane used at the interface. The additional layer/medium could be, for example, an additional ionic liquid or a non-ionic liquid electrolyte solution. The materials selected and design approach used may vary based on an array of factors, including cost, intended life cycle, energy density, power density, etc.

The foregoing illustrated embodiments have been provided solely to illustrate the structural and functional principles of the present invention and should not be regarded as limiting. To the contrary, the present invention is intended to encompass all modifications, alterations, substitutions, and equivalents within the spirit and scope of the appended claims.

What is claimed:

1. An electrochemical metal-air cell, comprising:
a flexible fuel electrode for oxidizing a metal fuel;
a flexible air electrode for absorbing and reducing gaseous oxygen;
an ionically conductive medium comprising a low temperature ionic liquid having a melting point at or below 150° C. at 1 atm. and contained in a space between the flexible fuel electrode and the air electrode for conducting ions for supporting the electrochemical reactions at the fuel and air electrodes, the ionic liquid positioned to contact both the flexible fuel electrode and the air electrode; and
one or more seal members along a periphery of the fuel and air electrodes for sealing the space between the fuel and air electrodes to contain the ionic liquid therein, said seal members being electrically insulating to prevent electrical conduction between the fuel and air electrodes;
wherein the flexible fuel electrode and the flexible air electrode are arranged in a compacted non-linear configuration with an external surface of the air electrode exposed for absorbing gaseous oxygen, and wherein the flexible fuel electrode and the flexible air electrode each further comprise a backing attached thereto in which the backing is impermeable to the ionic liquid.

2. An electrochemical metal air cell according to claim 1, further comprising an electrically insulating flexible separator;
wherein the flexible fuel electrode, the flexible air electrode, and the flexible separator are wound in a roll in the non-linear compact configuration with the flexible separator positioned between the external surfaces of the fuel electrode and the air electrode to prevent electrically conducting contact between the external surfaces of the fuel and air electrodes, said flexible separator being configured to permit exposure of the external surface of the air electrode to gaseous oxygen.

3. An electrochemical metal-air cell according to claim 2, further comprising a flexible internal separator that is electrochemically inert in the ionic liquid and electrically insulating, the flexible internal separator being wound in the roll and positioned in the space between the internal surfaces of the fuel and air electrodes to prevent electrically conducting contact between the internal surfaces of the fuel and air electrodes.

4. An electrochemical metal-air cell according to claim 2, further comprising a housing in which the roll is received.

5. An electrochemical metal-air cell according to claim 4, wherein the housing has an open axial airflow receiving end and an axial airflow receiving end of the roll faces the open axial airflow receiving end of the housing, the cell further comprising an airflow generator for forcing airflow into the open axial airflow receiving end of the housing and the axial airflow receiving end of the roll between the external surfaces of the fuel and air electrodes.

6. An electrochemical metal-air cell according to claim 5, wherein the housing has an open axial airflow exit end opposite the open axial airflow receiving end, and the roll has an axial airflow exit end facing the open axial airflow exit end of the housing, wherein the airflow generator is configured to force the airflow axially through the roll between the external surfaces of the fuel and air electrodes and axially outward from the axial airflow exit end of the roll for exit through the open axial airflow exit end of the housing.

7. An electrochemical metal-air cell according to claim 2, further comprising an airflow generator configured to force airflow into the roll between the external surfaces of the fuel and air electrodes.

8. An electrochemical metal-air cell according to claim 7, wherein the roll has an axial airflow receiving end and the airflow generator is configured to force the airflow into the axial airflow receiving end between the external surfaces of the fuel and air electrodes.

9. An electrochemical metal-air cell according to claim 8, wherein the roll has an axial airflow exit end opposite the axial airflow receiving end, and the airflow generator is configured to force the airflow into the axial airflow receiving end of the roll between the external surfaces of the fuel and air electrodes and outwardly from the axial airflow exit end.

10. An electrochemical metal-air cell according to claim 8, wherein the roll has a circumferential airflow exit defined by ends of the fuel and air electrodes on an outermost lap of the roll, and wherein the airflow generator is configured to force the airflow into the axial airflow receiving end of the roll between the external surface of the fuel and air electrodes and outwardly from the axial airflow exit.

11. An electrochemical cell according to claim 2, wherein the ionic liquid has a vapor pressure at or below 1 mm Hg at 20° C. above its melting point; and
wherein a ratio of combined electrode thickness to ionic liquid thickness is greater than or equal to 1:1.

12. An electrochemical metal-air cell according to claim 11, wherein the metal fuel comprises a metal selected from the group consisting of an alkaline earth metal, a transition metal and a post-transition metal.

13. An electrochemical metal-air cell according to claim 11, wherein the metal fuel comprises a metal selected from the group consisting of zinc, aluminum, gallium, manganese, and magnesium.

14. An electrochemical metal-air cell according to claim 1, wherein the ionic liquid has a vapor pressure at or below 1 mm Hg at 20° C. above its melting point.

15. An electrochemical metal-air cell according to claim 14, wherein the ionic liquid has a vapor pressure that is essentially immeasurable at 20° C. above its melting point.

16. An electrochemical metal-air cell according to claim 15, wherein a distance of the space between the fuel and air electrodes is in the range of 10 microns to 300 microns.

17. An electrochemical metal-air cell according to claim 16, wherein the distance of the space between the fuel and air electrodes is in the range of 10 microns to 100 microns.

18. An electrochemical metal-air cell according to claim 15, wherein a ratio of combined electrode thickness to ionic liquid thickness is in the range of 1:10 to 10:1.

19. An electrochemical metal-air cell according to claim 15, wherein a ratio of combined electrode thickness to ionic liquid thickness is greater than or equal to 1:1.

20. An electrochemical metal-air cell according to claim 14, wherein a distance of the space between the fuel and air electrodes is in the range of 10 microns to 300 microns.

21. An electrochemical metal-air cell according to claim 20, wherein the distance of the space between the fuel and air electrodes is in the range of 10 microns to 100 microns.

22. An electrochemical metal-air cell according to claim 14, wherein a ratio of combined electrode thickness to ionic liquid thickness is in the range of 1:10 to 10:1.

23. An electrochemical metal-air cell according to claim 14, wherein a ratio of combined electrode thickness to ionic liquid thickness is greater than or equal to 1:1.

24. An electrochemical metal-air cell according to claim 1, wherein a distance of the space between the fuel and air electrodes is in the range of 10 microns to 300 microns.

25. An electrochemical metal-air cell according to claim 24, wherein the distance of the space between the fuel and air electrodes is in the range of 10 microns to 100 microns.

26. An electrochemical metal-air cell according to claim 1, wherein a ratio of combined electrode thickness to ionic liquid thickness is in the range of 1:10 to 10:1.

27. An electrochemical metal-air cell according to claim 26, wherein a ratio of combined electrode thickness to ionic liquid thickness is greater than or equal to 1:1.

28. An electrochemical metal-air cell according to claim 1, wherein the ionically conductive medium consists essentially of the low temperature ionic liquid.

29. An electrochemical metal-air cell according to claim 28, wherein the low temperature ionic liquid is a room temperature ionic liquid.

30. An electrochemical metal-air cell according to claim 1, wherein the ionically conductive medium consists of the low temperature ionic liquid.

31. An electrochemical metal-air cell according to claim 30, wherein the low temperature ionic liquid is a room temperature ionic liquid.

32. An electrochemical metal-air cell according to claim 1, wherein the ionically conductive medium is devoid of a solvent for dissolving the low temperature ionic liquid.

33. An electrochemical metal-air cell according to claim 32, wherein the low temperature ionic liquid is a room temperature ionic liquid.

34. An electrochemical metal-air cell according to claim 1, wherein the low temperature ionic liquid is a room temperature ionic liquid.

35. An electrochemical metal-air cell according to claim 1, wherein the ionically conductive medium consists essentially of the low temperature ionic liquid.

36. An electrochemical metal-air cell according to claim 35, wherein the low temperature ionic liquid is a room temperature ionic liquid.

37. An electrochemical metal-air cell according to claim 1, wherein the ionically conductive medium consists of the low temperature ionic liquid.

38. An electrochemical metal-air cell according to claim 37, wherein the low temperature ionic liquid is a room temperature ionic liquid.

39. An electrochemical metal-air cell according to claim 1, wherein the ionically conductive medium is devoid of a solvent for dissolving the low temperature ionic liquid.

40. An electrochemical metal-air cell according to claim 39, wherein the low temperature ionic liquid is a room temperature ionic liquid.

41. An electrochemical metal-air cell according to claim 1, wherein the low temperature ionic liquid is a room temperature ionic liquid.

42. An electrochemical metal-air cell according to claim 1, wherein the compact configuration is the flexible fuel electrode and the flexible air electrode being folded in an alternating manner with portions of the air electrode's external surface facing one another and portions of the fuel electrode's external surface facing one another.

43. An electrochemical metal-air cell according to claim 42, further comprising a plurality of separators positioned between at least the portions of the air electrode's external surfaces facing one another, the separators being configured to permit exposure of the portions of the air electrodes external surface to gaseous oxygen.

44. An electrochemical metal air cell according to claim 1, wherein the flexible fuel electrode and the flexible air electrode are wound in a roll as the non-linear compact configuration,
wherein the cell further comprises a retainer structure for positioning fuel electrode and the air electrode such that the external surfaces of the fuel electrode and the air electrode are maintained in spaced apart relation to prevent electrically conducting contact between the external surfaces of the fuel and air electrodes and permit exposure of the external surface of the air electrode to gaseous oxygen.

45. An electrochemical cell according to claim 1,
wherein the ionic liquid has a vapor pressure at or below 1 mm Hg at 20° C. above its melting point; and
wherein a ratio of combined electrode thickness to ionic liquid thickness is greater than or equal to 1:1.

46. An electrochemical metal-air cell according to claim 45, wherein the metal fuel comprises a metal selected from the group consisting of an alkaline earth metal, a transition metal and a post-transition metal.

47. An electrochemical metal-air cell according to claim 45, wherein the metal fuel comprises a metal selected from the group consisting of zinc, aluminum, gallium, manganese, and magnesium.

48. An electrochemical metal-air cell according to claim 1, wherein the metal fuel comprises a metal selected from the group consisting of an alkaline earth metal, a transition metal and a post-transition metal.

49. An electrochemical metal-air cell according to claim 1, wherein the metal fuel comprises a metal selected from the group consisting of zinc, aluminum, gallium, manganese, and magnesium.

50. An electrochemical metal-air cell, comprising:
a flexible fuel electrode for oxidizing a metal fuel;
a flexible air electrode for absorbing and reducing gaseous oxygen;
an ionically conductive medium comprising a low temperature ionic liquid having a melting point at or below 150° C. at 1 atm., the ionic liquid being contained in a space between the fuel electrode and the air electrode for conducting ions for supporting the electrochemical reactions at the fuel and air electrodes; wherein the ionic liquid contacts both the fuel electrode and the air electrode; and
one or more seal members along a periphery of the fuel and air electrodes for sealing the space between the fuel and air electrodes to contain the ionic liquid therein, said seal members being electrically insulating to prevent electrical conduction between the fuel and air electrodes;
wherein the ionically conductive medium further comprises a dissolved metal-containing additive.

51. An electrochemical metal-air cell according to claim 50, wherein said fuel and air electrodes are configured to essentially prevent liquid permeation of the low temperature ionic liquid therethrough via the external surfaces thereof.

52. An electrochemical metal-air cell according to claim 51, wherein the vapor pressure of the ionic liquid is at or below 1 mm Hg at 20° C. above its melting point.

53. An electrochemical metal-air cell according to claim 52, wherein the vapor pressure of the ionic liquid is at or below 0.1 mm Hg at 20° C. above its melting point.

54. An electrochemical metal-air cell according to claim 51, wherein a ratio of combined electrode thickness to ionic liquid thickness is in the range of 1:10 to 10:1.

55. An electrochemical metal-air cell according to claim 51, wherein a ratio of combined electrode thickness to ionic liquid thickness is greater than or equal to 1:1.

56. An electrochemical metal-air cell according to claim 55, wherein the ratio is greater than or equal to 2:1.

57. An electrochemical metal-air cell according to claim 56, wherein the ratio is greater than or equal to 3:1.

58. An electrochemical metal-air cell according to claim 50, wherein the metal fuel comprises zinc.

59. A method of operating an electrochemical metal-air cell, the cell comprising: (i) a flexible fuel electrode for oxidizing a metal fuel; (ii) flexible air electrode for absorbing and reducing gaseous oxygen; (iii) an ionically conductive medium comprising a low temperature ionic liquid having a melting point at or below 150° C. at 1 atm.; and (iv) one or more seal members along a periphery of the fuel and air electrodes for sealing a space between the fuel and air electrodes to contain the ionic liquid therein, said seal members being electrically insulating to prevent electrical conduction between the fuel and air electrodes, and the ionic liquid being contained in the space between the fuel electrode and the air electrode for conducting ions for supporting the electrochemical reactions at the fuel and air electrodes, wherein the ionic liquid contacts both the fuel electrode and the air electrode; wherein the flexible fuel electrode and the flexible air electrode each further comprise a backing attached thereto in which the backing is impermeable to the ionic liquid; and wherein the fuel electrode and the air electrode are arranged in a compacted non-linear configuration with an external surface of the air electrode exposed for absorbing gaseous oxygen; the method comprising:
  oxidizing the metal fuel at the fuel electrode;
  reducing absorbed gaseous oxygen at the air electrode; and
  conducting ions within the ionic liquid for supporting the electrochemical reactions at the fuel electrode and air electrode;
  wherein the method is performed with the ionic liquid at a temperature at or above its melting point.

60. A method according to claim 59, wherein the ionic liquid is at a temperature at which the vapor pressure of the ionic liquid is at or below 1 mm Hg.

61. A method according to claim 60, wherein the ionic liquid is at a temperature at which the vapor pressure of the ionic liquid is at or below 0.1 mm Hg.

62. A method according to claim 61, wherein the ionic liquid is at a temperature at which the vapor pressure of the ionic liquid is essentially zero.

63. A method according to claim 59, wherein the metal fuel comprises zinc.

64. An electrochemical metal-air cell, comprising:
  a flexible fuel electrode for oxidizing a metal fuel;
  a flexible air electrode for absorbing and reducing gaseous oxygen; and
  an ionically conductive medium comprising a low temperature ionic liquid having a melting point at or below 150° C. at 1 atm. and contained in a space between the flexible fuel electrode and the air electrode for conducting ions for supporting the electrochemical reactions at the fuel and air electrodes; and
  one or more seal members along a periphery of the fuel and air electrodes for sealing the space between the fuel and air electrodes to contain the ionic liquid therein, said seal members being electrically insulating to prevent electrical conduction between the fuel and air electrodes;
  wherein the reduction reaction supported at the air electrode reduces one mole of gaseous oxygen via multiple electrons produced at the flexible fuel electrode for oxidizing the metal fuel, and
  wherein the flexible fuel electrode and the flexible air electrode are arranged in a compacted non-linear configuration with an external surface of the air electrode exposed for absorbing gaseous oxygen.

65. An electrochemical metal-air cell according to claim 64, wherein the reduction reaction supported at the air electrode reduces one mole of gaseous oxygen via four electrons produced at the flexible fuel electrode for oxidizing the metal fuel.

\* \* \* \* \*